Aug. 6, 1935.   W. S. HOPKIN   2,010,669
METHOD OF MOLDING ARTICLES
Filed Aug. 26, 1930   2 Sheets-Sheet 1
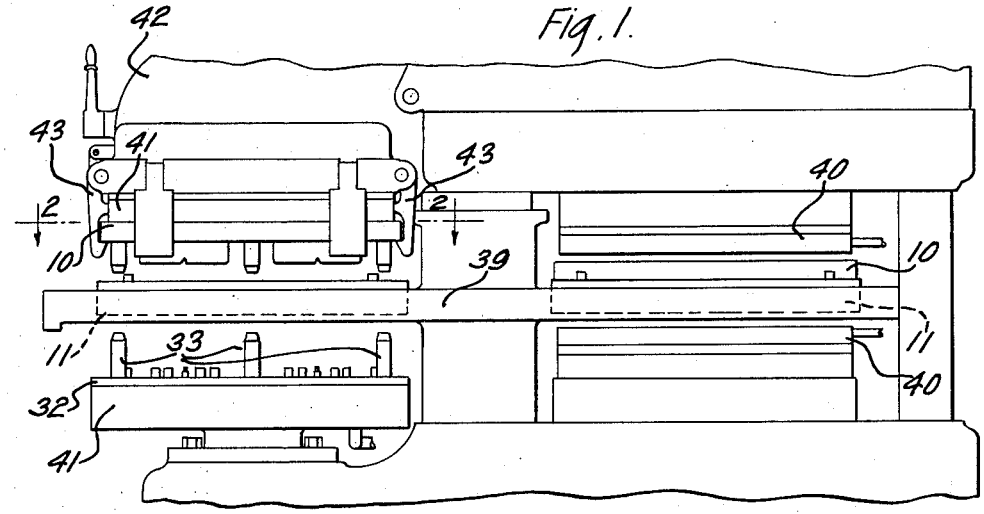
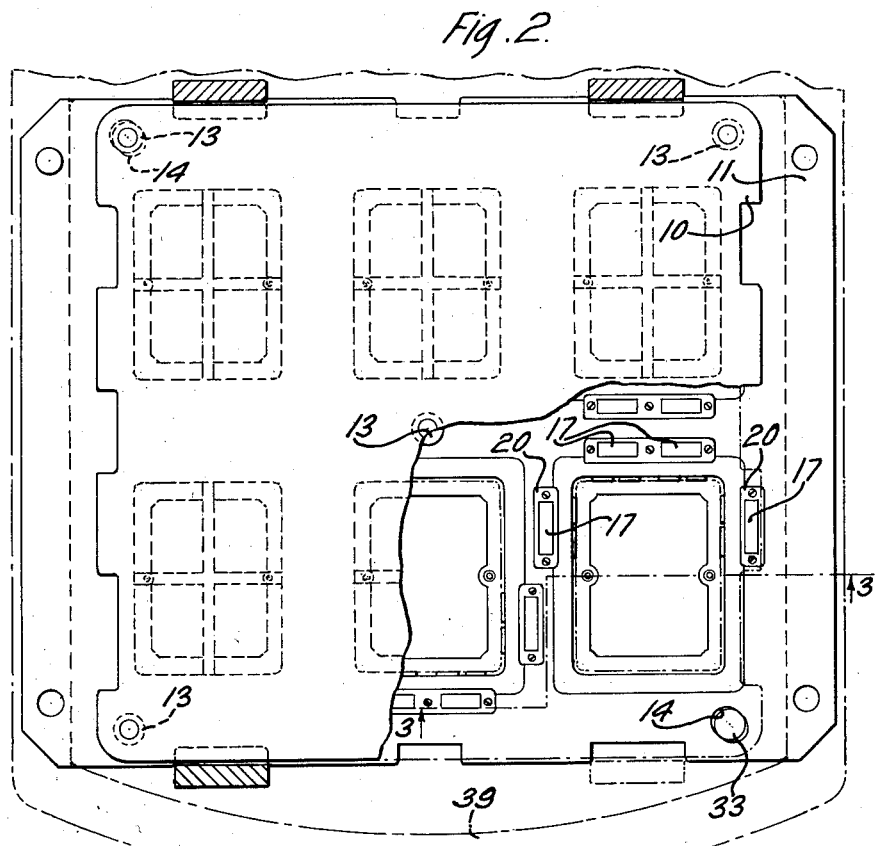
Inventor
W. S. Hopkin Aug. 6, 1935.     W. S. HOPKIN     2,010,669
METHOD OF MOLDING ARTICLES
Filed Aug. 26, 1930     2 Sheets-Sheet 2
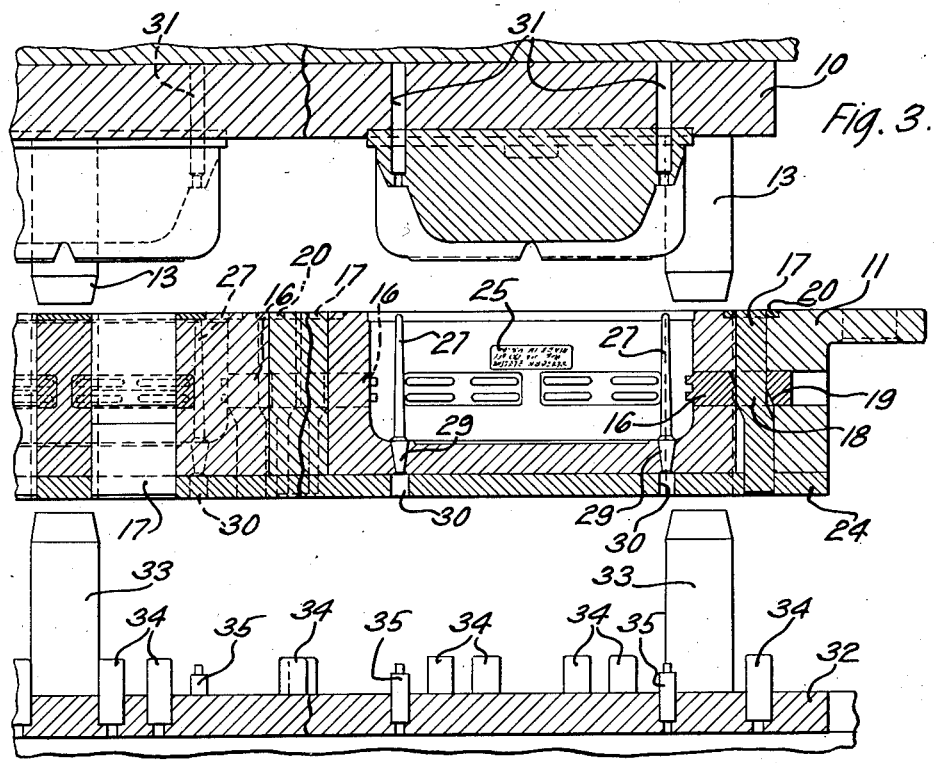
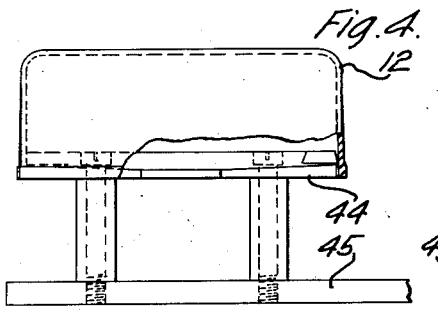
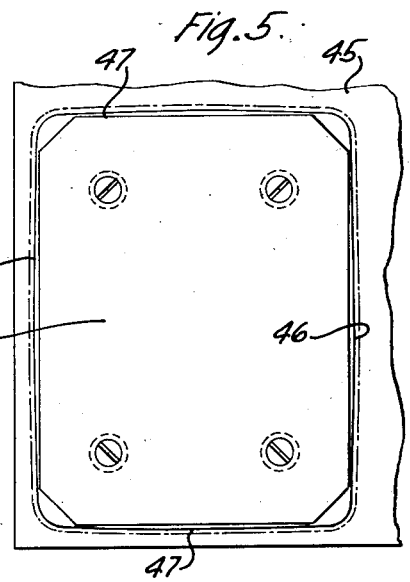
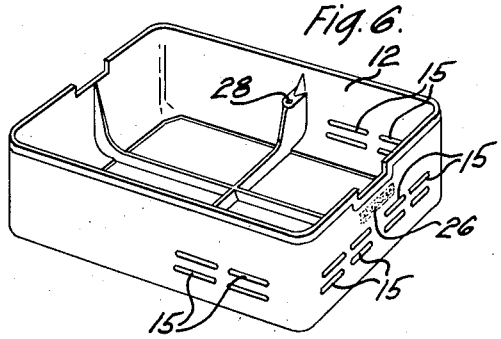
Inventor
W. S. Hopkin
By J. H. B. Whitfield Atty.

Patented Aug. 6, 1935

2,010,669

UNITED STATES PATENT OFFICE 2,010,669

METHOD OF MOLDING ARTICLES

Walter S. Hopkin, Oak Park, Ill., assignor to Western Electric Company, Incorporated, New York, N. Y., a corporation of New York Application August 26, 1930, Serial No. 477,827

5 Claims. (Cl. 18—55)

This invention relates to a method of and apparatus for molding articles, and more particularly to a method of and apparatus for molding composite articles from phenol plastic materials.

An object of this invention is to provide a simple and efficient method of and apparatus for accurately producing articles from plastic molding materials.

In accordance with this object as applied to the manufacture of telephone subset covers one embodiment of the invention includes a pair of complementary, upper and lower molding members or dies which form respectively the inner and outer surfaces of the subset cover. Pins in two diagonally opposite corners of one member engaging elongated receiving apertures in the other member which have their axes disposed in the direction of a line running through a center guide pin, thus allowing for unequal expansion in the two molding members in the heating and cooling thereof serve to guide the two molding members. Perforations or gong slots are formed in the side walls of the produced cover by means of movable inserts mounted in the lower molding member and operated by cams actuated upon opening and closure of the molding members. Pins loosely mounted in the lower molding member produce screw apertures in the cover and serve to eject the finished cover upon the movement of an ejector plate. A templet having bulged or curved edge surfaces serves to set the molded cover for a time during cooling, so that when the cover is completely cooled its sides will be straight.

Copending applications Serial Nos. 324,812 and 324,863, both filed December 10, 1928, show a molding press in which the molding members may be used and reference to these copending applications is made for more complete information on the press structure.

A clear understanding of the invention may be had from the following detailed description of this one embodiment and the accompanying drawings thereof, wherein Fig. 1 is a fragmentary side view of the molding press with which the molding apparatus is preferably used, Fig. 2 is a plan view, taken on the line 2—2 of Fig. 1, of the upper and lower molding members, Fig. 3 is a sectional view of the upper and lower molding members, taken on the line 3—3 of Fig. 2, and showing an ejector plate positioned beneath the lower molding member, Fig. 4 is an end view of the templet upon which the formed covers are cooled, Fig. 5 is a plan view of the templet, and Fig. 6 is a perspective view of the completed subset cover.

Referring now to the drawings in which like reference numerals designate similar parts throughout the several views there is disclosed a pair of complementary upper and lower multi-compartment molding members or dies 10 and 11 which are suitably designed and shaped to mold from powdered phenolic condensation product or other thermosetting molding material placed in the lower molding member 11, at a single operation a plurality of telephone subset covers 12 shown in Fig. 6. The upper molding member 10 has projecting portions while the inner surfaces of the cover 12, and the lower molding member 11 has cavities to form the outer surfaces of these covers. These molding members are made to engage each other properly by means of round central and corner guide pins 13 provided in the upper member 10 which fit within correspondingly positioned apertures in the lower molding member 11. A pair of these diagonally opposite apertures 14 (Fig. 2) are elongated or extended in the form of an ellipse along a diagonal line running through the center guide apertures so that the pins 13 engaging these apertures may move radially outwardly or inwardly upon relative expansion or contraction of one molding member with respect to the other due to their unequal heating or cooling. Thus these elongated diagonally opposite guide apertures 14 allow for relative radial expansion in the molding members but do not permit relative rotation therebetween because the pins snugly engage the sides of the apertures 14, and by reason of such an arrangement, and because the central pin 13 is made to fit its aperture snugly the walls of the cover 12 produced by each compartment of the mold are of the same thickness throughout and a uniform product is produced. The other two pins 13 at the upper right and lower left hand corners (Fig. 2) are not used for aligning purposes and do not snugly engage their apertures but are simply used to raise the upper molding member 10 from the lower molding member 11 in the ejecting process which will be described later.

The gong slots or perforations 15 in the end of the cover member 12 are formed by movable horizontal inserts or cores 16 mounted in the lower molding member 11 around the end of each mold compartment and which are reciprocated into and out of the mold cavity by vertically disposed blank like cams 17. Each of the cams is provided with a central camming or angular portion 18 which engages a correspondingly cammed aperture 19 of each insert 16, as clearly appears in the case of one such insert located at the right hand end of the molding member 11 in Fig. 3. The upper ends of the cams 17 have individual washers or packing 20 secured therearound to prevent dust or the powdered molding material from interfering with their operation, and the lower ends of these cams extend through apertures in a bottom cover plate 24 secured to the molding member 11.

An inscription or configuration 25 (Fig. 3) containing the manufacturer's name is formed in one end of each mold compartment of the molding member 11 to impress a corresponding configuration 26 in the end of each molded cover 12. A pair of upright pins 27 for forming a screw aperture 28 in each side of the cover 12 are loosely or removably supported in each lower mold compartment by means of lower inverted cone shaped ends 29 thereof engaging corresponding recesses in the lower molding member 11, and these cone shaped ends terminate adjacent to apertures 30 provided in the bottom plate 24 for receiving ejecting mechanism, as will appear presently, to eject the pins 27. Apertures 31 are provided in the upper molding member 10 for receiving the pins 27 upon the closure of the molding members 10 and 11 in the molding process.

In order to eject the molded covers 12 an ejector plate 32 is provided beneath the lower molding member 11 and has pins 33 for piercing through apertures in the molding member 11 and engaging the guide pins 13 of the upper molding member 10 to raise the molding member 10 out of engagement with the lower molding member 11. Pins 34 are provided on the ejector plate 32 directly below the lower ends of the cams 17 to raise these cams when the ejector plate is moved upwardly, thereby moving the inserts 16 out of the mold cavities, and pins 35 extend upwardly from the ejector plate 32 for engaging the lower ends of the movable pins 27 to raise these pins and thereby eject the covers 12 from the mold at the time that the inserts 16 have been moved outwardly, as just described.

The molding members 10 and 11 and the ejector plate 32 may be operated by means of various types of known presses, and in the operation the molding member 10 is first withdrawn upwardly from the lower molding member 11, and the pins 27 are inserted in position in the molding member 11 by hand. The powdered phenolic material or other molding material is then manually deposited and distributed in the various molding compartments in the lower molding member 11 and the molding member 10 is then brought down into engagement with molding member 11, the guide pins 13 effecting an accurate alignment therebetween, as aforedescribed. When the members 10 and 11 close upon each other the member 10 engages the top ends of the cams 17 and thereby forces the inserts 16 inwardly to form the slots 15 in each cover 12 formed by the molding members.

The molding members 10 and 11 are now subjected to heat and pressure to mold the covers 12, and next the members 10 and 11 are cooled by exposing them to cooling platens to complete the curing operation and to shrink the covers free of the walls of the molds, thereby producing the configuration or inscription 26 in one end of the cover. Then the ejector plate 32 is moved underneath the molding member 11 and raised so that the pins 33 engage the guide pins 13, thereby separating the molding members. At this time the pins 34 of the ejector plate also engage and raise the cams 17 to move or withdraw the inserts 16 out of the mold cavities, and the pins 35 engage the lower ends of the screw aperture forming pins 27 to move the latter pins upwardly to raise thereby the molded covers 12 a slight distance out of the compartments of the molding member 11. The covers 12 with the pins 27 adhering thereto are then, after the molding member 10 is secured clear of the molding member 11, manually removed from the molding member 11. Before another set of covers are molded the molding members 10 and 11 are brought into engagement with each other to move the cams 17, which will be projecting a slight distance upwardly from the molding member 11, downwardly to move the inserts 16 inwardly in the molding position. Then the molding members 10 and 11 are again separated, and are made ready for another molding operation by inserting the pins 27 in the member 11 as mentioned above.

The preferable press for operating the molding members 10 and 11, and the ejector plate 32 in the above described manner is the one described in detail in the aforementioned copending applications Serial Nos. 324,812 and 324,863 and shown in side elevation in Fig. 1. This type of press is double acting in that two sets of the pairs of molding members 10 and 11 are carried by a rotatable table 39, and while the set at the right hand side is subjected to heating and pressing platens 40—40 to mold the covers 12, the set 10 and 11 at the left hand side is subjected to cooling platens 41—41, or exposed to the ejector plate 32 which may be inserted above the lower platen 41 which is adapted to raise said ejector plate into engagement with the molding members to separate them as above described, and eject the molded covers. A tiltable head 42 provided with latches 43—43 maintains the upper and the lower molding members 10 and 11 separated during the ejecting and filling operations.

While the molded covers 12 are being removed from the lower molding member 11 the pins 27 remain clinging to them, and these pins are manually removed from the covers and the covers 12 are inverted by hand and have their rims or brims inserted over templets 44 arranged in multiple in an elevated manner on a common base plate 45, one of these templets appearing in Figs. 4 and 5. Each templet 44 has convex or bulged side and end surfaces 46—46 and 47—47 which cause the rims of the cover 12 to bulge outwardly upon cooling and shrinking around the templet. After this setting over the templets the covers are removed therefrom and allowed to cool completely, when their sides or walls become exactly straight and will accurately fit the mounting member to which they are later to be applied. The walls of the covers of their own accord would tend to shrink concavely or warp inwardly, but by giving them this preliminary outward set when they become thoroughly cool their walls are exactly straight.

Therefore it is believed to be apparent from the foregoing description that the molding apparatus herein disclosed accurately and efficiently produces the cover members which it is designed to construct. Although one specific embodiment of the invention has been described in detail, it will of course be understood that the invention is not to be limited thereto but is to apply to the scope of the appended claims.

What is claimed is:

1. A method of molding moldable material of a kind which tends to warp during cooling, subjecting the material to heat and pressure in a mold, removing the molded article from the mold, and giving the article a predetermined set during initial cooling to compensate for distortion during final cooling.

2. A method of molding moldable material of a kind which tends to warp during cooling, subjecting the material to heat and pressure in a mold, removing the molded article from the mold, and giving an outwardly bulging set to the walls of the article during initial cooling whereby the walls become straight on final cooling.

3. A method of molding moldable material of a kind which tends to warp during cooling, subjecting the material to heat and pressure in a mold, removing the molded article from the mold, placing the removed article upon a templet to effect a convexly curved shape in the walls of the material during initial cooling and removing the article from the templet during final cooling.

4. A method of molding moldable material of a kind which tends to warp during cooling, molding the material, later setting the molded material over a templet, initially cooling the material to cause it to assume a shape opposite to the shape which the material would naturally assume, removing the material from the templet and finally cooling the material to assume a final form.

5. The method of molding multisided hollow articles which comprises placing in a mold under heat and pressure a moldable material of a kind which tends to warp when cooling, removing the article from the mold, applying a force to bend a wall of the article outwardly, cooling the article for a period while maintaining said wall in said bent position, removing the restraint from said wall and cooling the article for a further interval.

WALTER S. HOPKIN.